United States Patent [11] 3,621,080

[72] Inventor Robert De Coene
 Brussels, Belgium
[21] Appl. No. 801,196
[22] Filed Feb. 20, 1969
[45] Patented Nov. 16, 1971
[73] Assignee Solvary & Cie
 Brussels, Belgium
[32] Priority Feb. 23, 1968
[33] Netherlands
[31] 6802617

[54] RESIN COMPOSITIONS HAVING A BASE OF POSTCHLORINATED POLYVINYL CHLORIDE AND A PROCESS FOR THE PREPARATION THEREOF
 7 Claims, No Drawings
[52] U.S. Cl. .................................................. 260/897 C,
 260/29.6 RB, 260/29.6 WA, 260/96 HA
[51] Int. Cl. ........................................................ C08f 29/12
[50] Field of Search ............................................ 260/897,
 899

[56] References Cited
 UNITED STATES PATENTS
 3,470,269 9/1969 Dobovsek ..................... 260/897
 3,459,692 8/1969 Buning et al. ................. 260/23
 3,299,182 1/1967 Jennings et al. .............. 260/897
 3,242,234 3/1966 Frey et al. ..................... 260/897

Primary Examiner—Murray Tillman
Assistant Examiner—C. J. Seccuro
Attorneys—Robert E. Burns and Emmanuel J. Lobato ABSTRACT: Resin compositions containing postchlorinated polyvinyl chloride and heterogeneously chlorinated polyethylene are prepared by chlorinating an aqueous suspension of polyvinyl chloride until the chlorine content of the polymer reaches a predetermined value between 58 percent and 73 percent by weight, introducing polyethylene into the aqueous suspension in an amount of 5 to 50 percent by weight with respect to the sum of the quantities of polyvinyl chloride and polyethylene and then subjecting the polyethylene to the action of chlorine at a temperature below 85° C. The resulting resin is easy to work and has a high impact strength and high resistance to heat deformation.

3,621,080

RESIN COMPOSITIONS HAVING A BASE OF POSTCHLORINATED POLYVINYL CHLORIDE AND A PROCESS FOR THE PREPARATION THEREOF

BACKGROUND OF THE INVENTION

The present invention relates to a method for the preparation of resinous compounds having a base of chlorinated polyvinyl chloride and heterogenously chlorinated polyethylene which have high impact strength, and which are particularly easy to work.

It is well known that postchlorinated polyvinyl chloride has a resistance to heat deformation superior to that of polyvinyl chloride. However, the higher the chlorine content of the postchlorinated polymer, the higher are the temperatures required for its use. In practice it is impossible to extrude at a temperature above 220° c. without risking partial or even total decomposition of the polymer. The application of postchlorinated polyvinyl chloride therefore constitutes a difficult problem.

In addition, the possible uses of postchlorinated polyvinyl chloride are further limited since, in some cases, resins having a base of postchlorinated polyvinyl chloride are exceedingly fragile. Such resins, in particular, have a lower impact strength than is required for many applications.

It has been found necessary, therefore, to incorporate in compositions of postchlorinated polyvinyl chloride, additives which facilitate their application and give them a high impact strength while retaining the desirable properties of the base polymer, particularly its high resistance to thermal deformation.

Among these additives, polyethylene chlorinated in homogenous fashion has proved effective (German Pat. No. 1,111,383 of Oct. 13, 1956 by FARBEWERKE HOECHST, and U.S. Pat. No. 3,299,182 of May 5, 1961 by B. F. Goodrich Co.). However, polyethylene which has been chlorinated heterogenously has not been found to be a desirable additive, in that it does not yield resins of appreciably improved properties (Netherlands Pat. No. 120,071 of May 15, 1959 by FARBEWERKE HOECHST).

In comparison to the heterogeneous chlorination of polyethylene which can be carried out simply by chlorination of polyethylene in aqueous suspension, at a temperature below 100° C., and generally comprised between 60° and 85° C., homogeneous chlorination of polyethylene requires a much more complicated and more expensive procedure. Homogeneous methods require, in particular, a more rigorous temperature for the chlorination of polyethylene in aqueous suspension namely a temperature comprised between 110° and 150° C. (Netherlands Pat. No. 120,071 of May 15, 1959 by FARBEWERKE HOECHST), or the chlorination of the polyethylene is carried out in a solution of an organic solvent which must be recovered at the end of the operation, (U.S. Pat. No. 3,299,182 of May 5, 1961 by B. F. Goodrich CO.).

SUMMARY OF THE INVENTION

The object of the present invention is the provision of an economical method for substantially improving the workability and the impact strength of chlorinated vinyl chloride polymers while retaining their natural resistance to heat deformation.

Another object of the present invention is to provide a resin composition having a base of chlorinated polyvinyl chloride which is easily workable and which has high impact strength as ell as excellent resistance to heat deformation.

Specific objects of the present invention include the provisions of a resin composition and method of preparation therefor having a base of chlorinated polyvinyl chloride and having the desirable properties mentioned above, by employment of heterogeneously chlorinated polyethylene.

These objects and others have been attained by the present invention as described below.

It has been found that a resin composition which is easy to work and which has high impact strength and resistance to heat deformation is obtained by subjecting polyvinyl chloride in an aqueous suspension in which the ratio of water to polymer is between 1.5 and 5 to the action of chlorine at a temperature of 30° to 80° C. until the chlorine content of the polymer has reached a predetermined value comprised between 58 percent and 73 percent by weight, introducing polyethylene into the aqueous suspension in an amount of 5 to 50 percent by weight based on the sum of the quantities of polyvinyl chloride and polyethylene used and then subjecting the polyethylene to the action of chlorine at a temperature below 85° C., until the chlorine content of the polyethylene reaches 5 percent to 45 percent by weight. The resinous mixture may then be separated from the chlorination medium. Polyvinyl chloride used in this process must be obtained either by mass polymerization or polymerization in aqueous suspension of vinyl chloride in the presence of an acyl peroxide. The resulting resinous mixture is then separated from the chlorination medium.

DESCRIPTION OF PREFERRED EMBODIMENTS

The chlorination of polyvinyl chloride according to the present invention is a simple, rapid operation which costs little. The entire process is particularly economical since it is carried out in a single reactor. Further, no particular precautions are required, for example, the application of an agent to effect swelling of the polymer, and the use of actinic light are unnecessary.

In accordance with the present process, it is necessary that the starting polymer be obtained by polymerization in aqueous suspension or by mass polymerization, and by means of an acyl peroxide such as the benzyl peroxide, lauryl peroxide, octanyl peroxide, 2,4-dichlorobenzyl peroxide, and $\alpha$-chlorolauryl peroxide, etc.

The aqueous suspension of polyvinyl chloride to be chlorinated can come directly from the polymerization of the vinyl chloride in aqueous suspension or it can be obtained by the suspension of a drained cake of polymer prepared by polymerization in aqueous suspension or, by suspension of the solid polymer prepared by mass polymerization.

Moreover, it is advantageous to use polyvinyl chloride which has a K number measured in 1,2-dichloroethane, comprised between 40 and 80, a relative viscosity measured in 1,2-dichloroethane comprised between 1.2 and 1.8 and an apparent specific weight, by tamping of 0.40 to 0.80 kg./dm.$^3$. It is also preferable that the polyvinyl chloride in the solid state be in the form of a white powder constituted of particles having a diameter varying between 0.5 and 0.05 mm. Polyvinyl chloride having these characteristics is available under the trade names SOLVIC S229 and SOLVIC S239.

By polyethylene is meant homopolymers of ethylene as well as copolymers containing at least 50 percent by weight of ethylene the comonomers being chosen by preference among other olefins such as propylene, butene, isobutene, etc.

Any type of polyethylene can be used provided that it is a solid polyethylene. Nevertheless, the use of polyethylene and copolymers of ethylene of average density or low density, that is to say wherein the density is comprised between 0.910 and 0.945 is preferred.

Resin compositions which are particularly useful from the point of view of impact strength and resistance to thermal deformation are those in which the chlorinated polyvinyl chloride has a chlorine content comprised between 58 and 73 percent by weight. It is preferable to carry out the chlorination of polyvinyl chloride under increasing temperature within the range of about 30° to 80° C.

Both stages of the chlorination may be carried out under atmospheric pressure; however, it is preferable to operate under pressure in order to reduce the time required for the reaction. The chlorine is usually introduced into the reaction medium in the first stage of the reaction under an effective pressure of 2–10 kg. e./cm.$^2$ and preferably from 4–5 kg. e./cm.$^2$ (effective or gauge pressure i.e. pressure above atmospheric pressure).

During the second stage of the reaction the pressure is maintained between atmospheric and 5 kg. e./cm.$^2$ and preferably between 1 and 3 kg. e./cm.$^2$ In this regard, it should be noted that the chlorine content of the vinyl chloride polymer reached during the first stage of the chlorination process, i.e., prior to the addition of polyethylene does not change substantially during the second stage of chlorination, i.e., after the addition of polyethylene. The chlorine introduced during the second stage of chlorination fixes itself preferably to the polyethylene, and the chlorination takes place in heterogenous fashion, since the chlorination temperature in the second stage is selected below about 85° C. preferably between 60° and 85° C.

The minimum quantity of polyethylene required for a substantial improvement in the desire properties of postchlorinated polyvinyl chloride is 5 percent by weight with respect to the total weight of the resin involved. Quantities larger than 50 percent by weight are not justified in view of the goals sought by the present invention. In practice, the use of polyethylene is preferably limited to 5 to 15 percent by weight.

Moreover, in order to obtain the desired improvement in properties, it is necessary that the chlorine content of the chlorinated polyethylene found in the final composition be comprised between 5–45 percent by weight and preferably between 20 and 40 percent by weight.

In the following examples, 1 and 5 are given by way of comparison and 2 through 4 and 6 through 11 are given by way of illustration; the latter examples show the best mode currently contemplated for carrying out the present invention and in particular indicate the improvement in the impact strength and facility of application of the resin of the present invention, however, these examples must not be construed as limiting the scope of the invention in any manner whatsoever.

Example 1 given by way of comparison indicate the properties of pure chlorinated polyvinyl chloride.

EXAMPLE 1 (Comparison)

The polyvinyl chloride utilized was prepared by polymerization of vinyl chloride in aqueous suspension, in the presence of lauryl peroxide as the catalyst and polyvinyl alcohol as the suspending agent. This polymer has a Fiekentscher K number, measured in 1,2-dichloroethane, of 66, a relative viscosity measured in 1,2 dichloroethane of 1.54, and an apparent specific weight by tamping of 0.58 kg./dm.$^3$ In the solid state, the polymer is in the form of a white powder constituted by particles having a diameter comprised between 0.2 and 0.05 mm.

The aqueous suspension of polyvinyl chloride to be subjected to chlorination was prepared by resuspension of a drained cake of freshly prepared polymer, and adjustment of the water-polymer ratio to the value of 3.3, that is to say, an absolute value of 990 g. of polymer and 3,300 g. of water.

Chlorination was carried out in a 6 l. enameled autoclave provided with an agitator rotating at 200 r.p.m. Chlorine was introduced in the said aqueous suspension of polyvinyl chloride at a pressure of 4 kg. e./cm.$^2$. The operation required 13.5 hours, during which time the temperature was maintained at 55° C. for 3 hours, then at 65° C. for 2 ½hours at 75° C. for 1 hour and after interruption of the arrival of the charge, 5½ hours at 80° C. The time required for the temperature rise between two levels was one-half hour.

The resulting chlorinated polyvinyl chloride was separated from the aqueous phase.

The properties of this polymer have been summarized in table 1 below.

EXAMPLE 2–4

The polyvinyl chloride described in example 1 was employed, and chlorination was carried out under conditions identical to those of example 1.

In an aqueous suspension of the thus-produced chlorinated polyvinyl chloride 110 g. of a high-density polyethylene with a density of 0.953, and a softening point of 124° C. (according to ASTM standard D 1525–58T) was introduced. Chlorine was then introduced at a pressure of 2 kg. e./cm.$^2$ the temperature of the medium being kept at 80° C.

The introduction of chlorine was interrupted when the prescribed quantity of chlorine to be fixed on the polyethylene, which was varied in each example had been introduced into the autoclave.

The chlorine was then allowed to be absorbed until the pressure became 0. The second stage of the chlorination process required between 1.5 and 3 hours depending on the amount of chlorine introduced.

The data corresponding to the conditions employed in each of examples 2 to 4, as well as the properties of the resinous mixtures obtained are grouped in table 1 below.

TABLE 1

| EXAMPLES | 1 | 2 | 3 | 4 |
| --- | --- | --- | --- | --- |
| Polyvinyl chloride g. | 990 | 990 | 990 | 990 |
| Water g. | 3,300 | 3,300 | 3,300 | 3,300 |
| Chlorine content of chlorinated polyvinyl chloride obtained, % by weight | 66 | 66 | 66 | 65.9 |
| Polyethylene, g. | — | 110 | 110 | 110 |
| Chlorine content of chlorinated polyethylene, % by weight | — | 25.6 | 27.2 | 31.9 |
| Mechanical properties of resinous mixtures obtained | | | | |
| Heat distortion temperature (ASTM Standard D 648), °C. | 113 | 108.4 | 109.1 | 109.3 |
| Macklow-Smith flow pressure at 190° C. kg./cm.$^2$ | 260 | 125 | 132 | 133 |
| IZOD impact strength at 20° C., kg. cm./cm. | 2.4 | 10 | 11.4 | 10.4 |

Examination of table 1 shows that the resinous mixtures prepared according to the method of the invention are easier to apply than pure chlorinated polyvinyl chloride (lower Macklow-Smith flow pressures), have a definitely better impact strength, and a comparable resistance to heat deformation (see heat distortion temperatures).

EXAMPLE 5 (Comparison)

The polyvinyl chloride utilized was prepared by polymerization of the vinyl chloride in aqueous suspension with the aid of lauryl peroxide as the catalyst and polyvinyl alcohol, as the suspending agent. This polymer has a Fikentscher K number measured in 1,2-dichloroethane of 59, a relative viscosity measured in 1,2-dichloroethane of 1.428 and an apparent specific weight by tamping of 0.60 kg./dm.$^3$ In the solid state it is in the form of a white powder constituted by particles of a diameter comprised between 0.2 and 0.05 mm.

The aqueous suspension of polyvinyl chloride which was subjected to chlorination was prepared by resuspension of a drained cake of freshly prepared polymer, and adjustment of the water to polymer ratio at the value of 3.3, that is to say an absolute value of 2,640 g. of polymer and 8,800 g. of water.

The chlorination was carried out in a 16 l. enameled autoclave equipped with an agitator turning at 200 r.p.m. under conditions identical to those of in example 1.

The properties of the resulting chlorinated polyvinyl chloride (also called postchlorinated polyvinyl chloride herein) have been summarized in table 2 below.

EXAMPLES 6 TO 12

The polyvinyl chloride described in example 5 was used and chlorinated under identical conditions.

In examples 6 to 9, 293 g. of a low-density polyethylene (marketed by Imperial Chemical Industries Ltd. under the name of Alkathene No. 11,300) having a density of 0.918 and a Vicat point of 89.3° C., determined on plates at 5 kg. was introduced into the aqueous suspension of thus-produced postchlorinated polyvinyl chloride and in the tests corresponding to examples 10 to 12, 293 g. of an ethylene-butene copolymer of low density made by the applicant, by polymerization at low pressure, containing 4.3 percent by weight of butene and having a density of 0.925 and a Vicat point of 108.1° C., determined on a plate at 5 kg.

In each of the examples the second stage of the chlorination process was carried out under conditions identical to those observed in examples 2 to 4.

The data corresponding to the tests in examples 6 to 12 as well as the properties of the resinous mixtures obtained, are collected in table 2 below.

TABLE 2

| | Examples | | | | | | | |
|---|---|---|---|---|---|---|---|---|
| | 5 | 6 | 7 | 8 | 9 | 10 | 11 | 12 |
| Polyvinyl chloride, g | 2,640 | 2,640 | 2,640 | 2,640 | 2,640 | 2,640 | 2,640 | 2,640 |
| Water, g | 8,800 | 8,800 | 8,800 | 8,800 | 8,800 | 8,800 | 8,800 | 8,800 |
| Chlorine content of postchlorinated polyvinyl chloride, percent by weight | 66 | 66 | 66 | 66 | 66 | 66 | 66 | 66 |
| Polyethylene, g | | 293 | 293 | 293 | 293 | 293 | 293 | 293 |
| Chlorine content of chlorinated polyethylene, percent by weight | | 20 | 25 | 30 | 35 | 20 | 30 | 35 |
| Mechanical properties of the resinous mixtures obtained: | | | | | | | | |
| Heat distortion temperature (ASTM standard D 648), ° C | 106 | 99.3 | 98.1 | 98.8 | 101.3 | 105.1 | 99.6 | 98.8 |
| Macklow-Smith flow pressure at 200° C., kg./cm.$^2$ | 210 | 100 | 106 | 104 | 107 | 117 | 113 | 115 |
| Impact strength on injected cups [1]: | | | | | | | | |
| Energy absorbed, g.m. | 50 | 147 | 106 | 124 | 118 | 184 | 135 | 258 |
| Rupture, percent | 100 | 57 | 53 | 50 | 40 | 47 | 50 | 48 |

[1] The figures for impact strength on injected cups (cupels) were determined by a test developed by the applicant, as will be described below.

With respect to the impact test used herein, the figures obtained are equivalent to the energy of fall of a body yielding about 50 percent rupture of the cups by the so-called "staircase" method. According to this method, the height at a figure of 0.5, 1 or 2 m. is fixed, and in each case the weight of the body which will strike the cup is varied by increments or decrements, depending on whether the cup tested did or did not break in the course of the test. For each test, a cup in the form of a flat bottom bowl is used. The bottom, of circular shape, on which the impact is applied, is 7 cm. in diameter and 2 mm. thick. The depth of the cup is 3.5 cm. For testing, the cup is placed on a support provided for the purpose. The impact of the freely falling body from a fixed height, strikes the bottom of the cup at a point equidistant from the outer edge and the injection point. The figure for impact strength on injected cups is equal to the product of the height times the weight of the body for which, statistically, about 50 percent of the samples of a given cup are broken.

Examination of table 2 shows, as in the case of examples 2 to 4, that resinous mixtures prepared according to the method of the invention are easier to apply then pure postchlorinated polyvinyl chloride (lower Macklow-Smith flow pressures), have a definitely better impact strength (definitely higher energies absorbed) and an acceptable resistance to heat deformation (see heat distortion temperatures).

In view of their properties, the resins obtained are suitable in particular for making articles including for example unions, elbows, and pipes, particularly articles designed to come in contact with very hot liquids; articles made from the present resins are capable of and withstanding rough handling.

What I claim and desire to secure by letters patent is:

1. Method for the preparation of a resin composition having a base of postchlorinated polyvinyl chloride and heterogeneously chlorinated polyethylene, said composition being easy to work and having high impact strength and resistance to heat deformation which comprises subjecting polyvinyl chloride in an aqueous suspension in which the ratio of water to polymer is between 1.5 and 5 to the action of chlorine at an increasing temperature in the range of about 30° to 80° C. until the chlorine content of the polymer reaches a predetermined value comprised between 58 percent and 73 percent by weight, said polyvinyl chloride having been prepared by the mass polymerization or aqueous suspension polymerization of vinyl chloride in the presence of an acyl peroxide, introducing a polyethylene into said aqueous suspension of thus-chlorinated polyvinyl chloride in an amount of 5 percent to 50 percent by weight based on the weight of the sum of the quantities of said polyvinyl chloride and said polyethylene and subjecting said polyethylene to the action of chlorine at a temperature lower than 85° C. until the chlorine content of said polyethylene reaches 5 to 45 percent by weight based on the weight of chlorinated polyethylene.

2. Method for preparation of resinous compositions with a base of postchlorinated vinyl polychloride and heterogenuously chlorinated polyethylene according to claim 1, in which said polyvinyl chloride which is subjected to chlorination has a Fikentschen K number, measured in 1,2-dichloroethane comprised between 40 and 80, a relative viscosity measured in 1,2-dichlorethane comprised between 1.2 and 1.8, an apparent specific weight by tamping of 0.40 to 0.80 kg./dm.$^3$ and in the solid state is in the form of a white powder constituted of particles of a diameter between 0.5 and 0.05 mm., and in which said polyvinyl chloride is subjected to the action of chlorine at a pressure of about 2 to 10 kg. e./cm.$^2$ and said polyethylene is subjected to the action of chlorine at a pressure of atmospheric to 5 kg. e./cm.$^2$ 3. Method for the preparation of resinous compositions with a base of postchlorinated polyvinyl chloride and heterogeneously chlorinated polyethylene according to claim 1, in which said polyethylene introduced into said aqueous suspension has a density comprised between 0.910 and 0.945.

4. Method for the preparation of resinous compositions with a base of chlorinated vinyl polychloride and heterogeneously chlorinated polyethylene, according to claim 1, in which said quantity of polyethylene introduced into said aqueous solution is 5 to 15 percent by weight of the sum of the quantities of polyvinyl chloride and polyethylene used.

5. Method for the preparation of resinous compositions with a base of chlorinated vinyl polychloride and a heterogeneously chlorinated polyethylene, according to claim 1, in which the quantity of chlorine fixed on said polyethylene is 20 to 40 percent by weight of chlorinated polyethylene.

6. As a new product, a resinous composition with a base of postchlorinated polyvinyl chloride and a heterogeneously chlorinated polyethylene, which is easy to work and has a high impact strength and resistance to heat deformation, obtained according to the method of claim 1.

7. A method according to claim 1 in which said polyethylene is selected from a homopolymer of ethylene and a copolymer of ethylene and other olefins wherein ethylene is present in an amount of at least 50 percent by weight.